US008832682B2

(12) United States Patent
Xu et al.

(10) Patent No.: US 8,832,682 B2
(45) Date of Patent: Sep. 9, 2014

(54) TRACE COLLECTION FOR A VIRTUAL MACHINE

(75) Inventors: Min Xu, Palo Alto, CA (US); Vyacheslav V. Malyugin, Los Gatos, CA (US); Jeffrey W. Sheldon, Mountain View, CA (US); Ganesh Venkitachalam, Mountain View, CA (US); Boris Weissman, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1144 days.

(21) Appl. No.: 12/058,545

(22) Filed: Mar. 28, 2008

(65) Prior Publication Data
US 2009/0248611 A1  Oct. 1, 2009

(51) Int. Cl.
*G06F 9/455* (2006.01)

(52) U.S. Cl.
CPC ................................. *G06F 9/45533* (2013.01)
USPC .............................................. 718/1; 717/128

(58) Field of Classification Search
None
See application file for complete search history.

(56) References Cited

U.S. PATENT DOCUMENTS

| | | | | |
|---|---|---|---|---|
| 6,625,751 | B1 * | 9/2003 | Starovic et al. | 714/11 |
| 6,704,925 | B1 * | 3/2004 | Bugnion | 717/138 |
| 6,802,054 | B2 * | 10/2004 | Faraj | 717/128 |
| 6,832,367 | B1 * | 12/2004 | Choi et al. | 717/130 |
| 7,409,667 | B1 * | 8/2008 | Pritchard et al. | 716/102 |
| 7,533,229 | B1 * | 5/2009 | van Rietschote | 711/161 |
| 7,844,954 | B2 * | 11/2010 | Venkitachalam et al. | 717/130 |
| 7,849,450 | B1 * | 12/2010 | Rydh et al. | 717/131 |
| 8,201,169 | B2 * | 6/2012 | Venkitachalam et al. | 718/1 |
| 8,307,443 | B2 * | 11/2012 | Wang et al. | 726/24 |
| 8,352,240 | B2 * | 1/2013 | Chow et al. | 703/26 |
| 2005/0198633 | A1 * | 9/2005 | Lantz et al. | 718/1 |
| 2007/0006314 | A1 * | 1/2007 | Costa et al. | 726/25 |
| 2007/0201621 | A1 * | 8/2007 | Ethier et al. | 379/32.05 |
| 2008/0046699 | A1 * | 2/2008 | Pauw et al. | 712/227 |
| 2008/0155299 | A1 * | 6/2008 | Vertes et al. | 713/600 |
| 2009/0089805 | A1 * | 4/2009 | Srinivasan | 719/318 |
| 2009/0132861 | A1 * | 5/2009 | Costa et al. | 714/45 |
| 2009/0165149 | A1 * | 6/2009 | Gonzalvo et al. | 726/34 |
| 2009/0249049 | A1 * | 10/2009 | Weissman et al. | 712/238 |
| 2009/0320011 | A1 * | 12/2009 | Chow et al. | 717/154 |
| 2009/0328044 | A1 * | 12/2009 | Bergheaud et al. | 718/101 |

OTHER PUBLICATIONS

Dunlap et al., "ReVirt: enabling intrusion analysis through virtual-machine logging and replay", Proceedings of the 5th symposium on Operating Systems design and implementation, 2002, (Dunlap_2002.pdf; pp. 211-224).*
Xu et al., VMware Inc., "ReTrace: Collecting Execution Trace with Virtual Machine Deterministic Replay", Jun. 2007, (Xu_June2007.pdf; pp. 1-8).*
Bhansali et al. "Framework for Instruction-level Tracing and Analysis of Program Executions" Jun. 16, 2006; Microsoft Corporation, (Bhansali_2006.pdf; pp. 1-10).*

\* cited by examiner

*Primary Examiner* — Emerson Puente
*Assistant Examiner* — Hiren Patel

(57) ABSTRACT

One embodiment is a computer-implemented method of trace collection for a virtual machine that includes: executing a sequence of instructions from an initial state of the virtual machine; accessing an event log of data relating to nondeterministic events, which data includes an execution point; making at least a portion of the data available to the virtual machine when the sequence reaches the execution point; collecting trace information in response to expansion parameters; and storing the trace information in a trace file.

21 Claims, 10 Drawing Sheets

VM Execution Modes

TRACE COLLECTION FOR A VIRTUAL MACHINE

TECHNICAL FIELD

One or more embodiments of the present invention relate to a virtualized computer system and, in particular, to a method and system for trace collection in a virtualized computer system.

BACKGROUND

As is well known, a trace is a sequence of logged information that indicates what events (e.g., instruction executions) have occurred while a program is running. When computer architects want to gather information about a running computer system, trace-driven techniques are often used to collect run time information ("execution traces") from a workload. A conventional trace collection system often uses specialized hardware or software that monitors and logs every instruction executed by the computer system. Offline, the execution traces are analyzed in detail, and are useful for applications such as debugging, fault tolerance, and performing various simulations.

Existing trace collection systems have several shortcomings. One shortcoming of existing trace collection systems is that they are unable to maximize trace completeness and detail level efficiently—a more detailed trace provides more information about the execution's internal state, thereby enabling a wider range of analysis of the running system. Conventional trace collection systems typically use software based techniques that incur increasingly high run-time overhead as trace detail increases. Other conventional trace collection systems use hardware based methods that require expensive and system-specific hardware probing devices.

Another shortcoming of existing trace collection systems is that they often introduce significant trace distortion. For example, a conventional trace collection system may introduce extra memory references in a memory trace that results in an inaccurate representation of a running program. Conventional trace collection systems may further introduce time dilation and memory dilation to a traced program. This occurs when tracing causes a program to run slower or to consume more memory.

Finally, existing trace collection systems usually operate continuously for only a short period of time due to the high bandwidth of the resulting trace data. This prevents long running executions from being traced, and generates large trace files that are difficult to store or share.

SUMMARY

One or more embodiments of the present invention are computer-implemented methods of trace collection for a virtual machine. In particular, one such embodiment is a computer-implemented method comprising: executing a sequence of instructions from an initial state of the virtual machine; accessing an event log of data relating to nondeterministic events, which data includes an execution point; making at least a portion of the data available to the virtual machine when the sequence reaches the execution point; collecting trace information in response to expansion parameters; and storing the trace information in a trace file.

DETAILED DESCRIPTION

Figure 1:
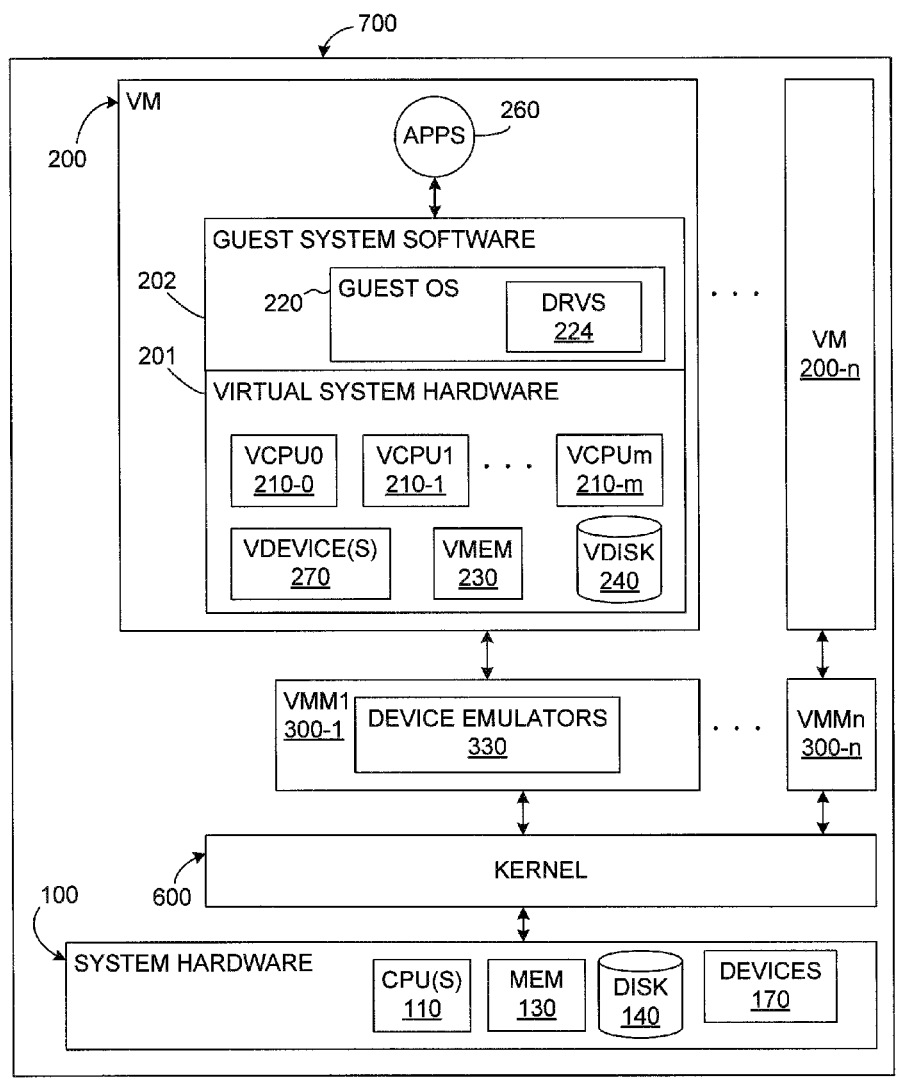
FIG. 1 illustrates a conventional non-hosted virtualized system.
Figure 2:
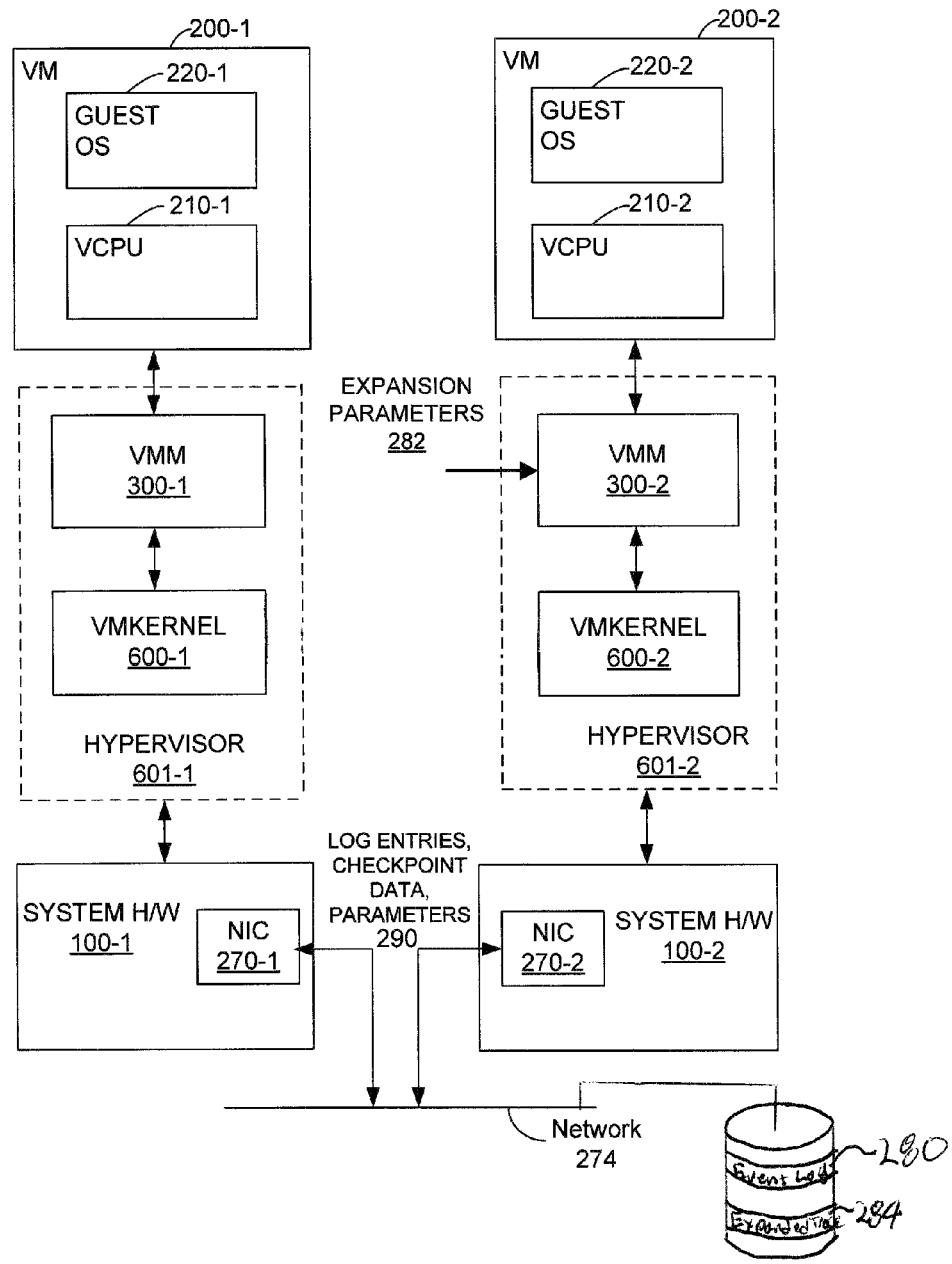
FIG. 2 illustrates a virtualized computer system for collecting an execution trace in accordance with one or more embodiments of the present invention.

A non-hosted virtualized computer system is described in the Appendix in conjunction with FIG. 1. FIG. 2 illustrates a virtualized computer system for collecting an execution trace in accordance with one or more embodiments of the present invention. As shown in FIG. 2, the virtualized computer system comprises capture virtual machine 200-1 (VM 200-1) and replay VM 200-2. In accordance with one or more such embodiments, capture VM 200-1 and replay VM 200-2 are the same virtual machine, i.e., the same virtual machine is used to capture an execution trace, and later, to replay the captured execution trace.

Capture VM 200-1 shown in FIG. 2 runs guest programs on guest operating system 220-1 (guest OS 220-1) using a virtualization layer, for example, hypervisor 601-1 (hypervisor 601-1 includes virtual machine monitor 300-1 (VMM 300-1) and VMKernel 600-1), as an intermediary to host system hardware 100-1 (system H/W 100-1), as explained below in the Appendix in conjunction with FIG. 1. In addition, replay VM 200-2 runs guest programs on guest OS 220-2 using a virtualization layer, for example, hypervisor 601-2 (hypervisor 601-2 includes VMM 300-2 and VMKernel 600-2), as an intermediary to host system hardware 100-2 (system H/W 100-2), as explained below in the Appendix in conjunction with FIG. 1. As further shown in FIG. 2, network interface cards (NICs) 270-1 and 270-2 communicate network packets between system H/W 100-1 and 100-2, respectively, via physical network 274.

As capture VM 200-1 executes a workload (the workload comprises a set of instructions to carry out one or more processes by VM 200-1), the virtualization layer, for example, VMM 300-1, captures information related to nondeterministic events, and logs the information in event log 280 (for example, and without limitation, event log 280 may be disk storage). In accordance with one or more embodiments of the present invention, event log 280 includes an indication of a known state from which logging of non-deterministic events began. The known state may be, for example and without limitation, an initial power up state of the system or a system "checkpoint." As is well known, a checkpoint is a stored data structure that captures a system state, including register values, memory content, etc. In accordance with one or more embodiments, beginning, for example, from the known state of VM 200-1, the virtualization layer, for example, VMM 300-1, detects each non-deterministic event, and stores an indication of each such non-deterministic event (including data relevant to the event, for example and without limitation, a packet of data) in event log 280 together with a current execution point of VM 200-1. An execution point provides information that serves as a measure of progress of VM 200-1 from the known state of the VM 200-1, and can be used (as described below) as a "timing" mechanism to record precisely when the non-deterministic event occurred in the execution sequence of VM 200-1. Such non-deterministic events may include, for example and without limitation, disk transfer events, serial port events, parallel port events, network packet events, keyboard events, timer events, etc. The events are non-deterministic because VMM 300-1 cannot predict the occurrence of the events based solely on the current state of VM 200-1.

In accordance with one or more embodiments of the present invention, logging only non-deterministic events enables VM 200-1 to operate with minimal time and memory space overhead, and reduces execution trace file size and trace distortion. By representing the execution trace using a minimum sized event log, the information can be shared among VMs such as VMs in FIG. 1 easily or stored for future processing. As described below, by capturing all sources of non-determinism, the original execution sequence can be recreated accurately by replay VM 200-2.

In accordance with one or more embodiments of the present invention, replay VM 200-2 replays the captured execution trace which is based on captured non-deterministic events stored in event log 280. In accordance with one or more such embodiments, replay VM 200-2 may be the same virtual machine (i.e., VM 200-1) that captured the execution trace, or it may be a different virtual machine. To do the replay, as indicated in FIG. 2, the virtualization layer, for example, VMM 300-2, reads event log 280, and causes VM 200-2 to replay an execution sequence that is logically equivalent to the execution sequence that produced the captured execution trace. By one definition, two execution sequences are logically equivalent if they contain the same set of execution points, and the VM state is identical at each execution point, where a VM state includes, for example and without limitation, guest-visible CPU registers, device registers, memory, and content of virtual disks. During replay, VM 200-2 begins executing from a known state, and each non-deterministic event is inserted into the execution sequence based on log entries in event log 280. In accordance with one or more embodiments of the present invention, event log 280 is accessible to replay VM 200-2 through, for example and without limitation, VMKernel 600-2, over physical network 274. In accordance with one or more such embodiments, each non-deterministic event is inserted into the replayed execution sequence at the execution point indicated in the captured execution trace. A logging and replay system for a virtual machine is described in more detail in U.S. patent application Ser. No. 12/058,465 entitled "Replay of Input/Output Events for a Virtual Machine" filed on Mar. 28, 2008, the contents of which are incorporated by reference herein in their entirety.

In accordance with one or more embodiments of the present invention, the virtualization layer, for example, VMM 300-2, monitors a replayed execution sequence in VM 200-2, and generates and stores expanded trace 284 (for example, and without limitation, on disk storage) based on a set of input expansion parameters 282. Expansion parameters 282 may be based on predetermined settings, or they may be configured by a user through a user interface (not shown). Alternatively, expansion parameters 282 may be configured in response to guest events, including, but not limited to, execution of instructions at a particular address or access to specific memory locations or to device I/O. In accordance with one or more embodiments of the present invention, expanded trace 284 comprises detailed information about the replayed execution sequence, and can include, for example, full instruction traces, memory reference traces, or device event traces. In addition, expanded trace 284 can include varying levels of detail depending on expansion parameters 282. For example, in accordance with one or more embodiments, expansion parameters 282 may specify whether a memory reference trace includes virtual addresses, physical addresses, or details of virtual to physical mappings. In accordance with one or more further embodiments, expansion parameters 282 may specify whether a memory reference trace includes operating system memory references, application memory references, or both. In accordance with one or more still further embodiments, a fully expanded trace can be filtered to collect traces only for a given user-level application.

In accordance with one or more still further embodiments, expansion parameters 282 can also indicate selective portions of a replayed instruction set for expansion. For example, in accordance with one or more such embodiments, a keyboard command from a user may control when to start and stop trace expansion during replay. Further, in accordance with one or more further such embodiments, a user, while monitoring replay of a captured execution trace, can select portions of execution for expansion. In one embodiment, expanded trace 284 can be stored to a storage medium for future analysis. Further, expanded trace 284 can be stored in any one of a number of compressed formats (e.g., a zip format) known to those of ordinary skill in the art.

In accordance with one or more embodiments, replay and expansion are performed in parallel by multiple replay VMs. For example, in accordance with one or more such embodiments, a captured execution sequence may be divided by recording multiple checkpoints and configuring each replay VM to begin replay from a different checkpoint. Expansion traces can be created in parallel by the multiple replay VMs. As one can readily appreciate from this, by replaying in parallel, expanded trace 284 can potentially be generated very quickly.

In accordance with one or more embodiments of the present invention, to monitor accurately the timing of external (non-deterministic) events during execution trace capture, the virtualization layer, for example, VMM 300-1, identifies an execution point in VM 200-1 at which the non-deterministic events occurred. An execution point represents execution of a specific instruction in a stream of instructions executed by VM 200-1. The execution point is logged with information related to the event to indicate where the event occurred in the stream of executed instructions. During replay and expansion, the virtualization layer, for example, VMM 300-2, monitors the execution point of instructions in a replayed execution sequence, and compares a current execution point in the replayed execution sequence with logged execution points corresponding to non-deterministic events. Virtual processor 210-2 (VCPU 210-2) of VM 200-2 shown in FIG.

2 is stopped at the logged execution point of a non-deterministic event so that information related to the logged event can be injected into the replayed execution stream at the correct execution point. By inserting this information during replay at the correct execution point, the system ensures that the replayed execution sequence will generate the same set of outputs as the originally logged execution.

Figure 3:
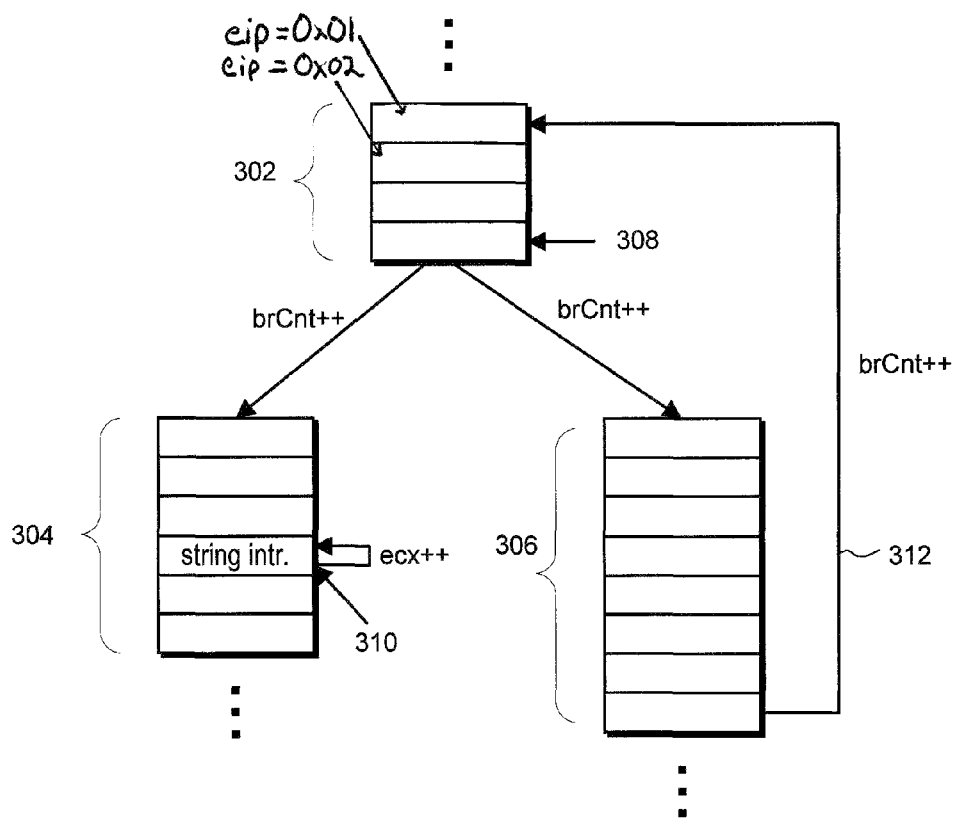
FIG. 3 shows a structure of a computer program in an x86 processor architecture comprising blocks of executable instructions to illustrate how an execution point can be tracked.

FIG. 3 shows a structure of a computer program in an x86 processor architecture comprising blocks 302, 304, and 306 of executable instructions to illustrate how an execution point can be tracked. In an x86 processor architecture, the execution point can be identified by a tuple {eip, brCnt, ecx}, where eip is an instruction pointer, brCnt is a branch counter, and ecx is an iteration counter. Each instruction is stored at a particular memory location in virtual memory of a virtual machine (for example, VM 200-1 shown in FIG. 2), which instruction is referenced by the instruction pointer (eip). The instruction pointer is ordinarily automatically incremented following execution of the referenced instruction, and the next instruction is then executed. For example, in block 302, virtual processor 210-1 (VCPU 210-1) of VM 200-1 executes an instruction at memory location 0x01 referenced by the instruction pointer (eip). The instruction pointer (eip) is then automatically incremented to reference an instruction at memory location 0x02, and so on. Because execution of a computer program is often iterative, however, the instruction pointer (eip) may reach the same value multiple times during execution of a program. For example, loop 312 may cause block 302 to be executed multiple times. Each time instructions in block 302 are executed, the instruction pointer (eip) loops through the same sequence of values (0x01, 0x02, etc.).

To distinguish between different iterations of the same instruction, in accordance with one or more embodiments, a virtual machine monitor (for example, VMM 300-1 shown in FIG. 2) maintains a branch counter (brCnt). The branch counter (brCnt) represents the total number of branches executed by the virtual processor (for example, VCPU 210-1) beginning from an initial state. In accordance with one or more embodiments of the present invention, a branch is executed when a branch instruction is executed, or an interrupt or exception occurs. A branch instruction includes any instruction that interrupts an incremental update of the instruction pointer (eip), and causes the instruction pointer (eip) to instead jump to a particular instruction elsewhere in virtual memory. For example, as shown in FIG. 3, an instruction at location 308 of block 302 may represent a conditional branch that causes the instruction pointer (eip) to jump to either block 304 or block 306, depending on the current system state. A branch instruction may also correspond to, for example, a loop instruction, or a subroutine call.

Some types of instructions (for example, a string instruction at location 310 of block 304 in FIG. 3) are executed multiple times by the virtual processor (VCPU 210-1). These instructions execute multiple times without updating the branch counter (brCnt) or the instruction pointer (eip). In the x86 architecture, each iteration of such an instruction is automatically counted by an iteration counter (ecx). For example, the string instruction at location 310 executes multiple times, with each iteration incrementing the iteration counter (ecx). As will be apparent in view of FIG. 3 and the description above, an execution point provides a measure of progress of the virtual machine from an initial state, and the execution point can be uniquely defined by the tuple {eip, brCnt, ecx}. As such, in accordance with one or more embodiments of the present invention, tracking this tuple provides a reliable timing mechanism that is used to tag external events for logging and replay.

Figure 4:
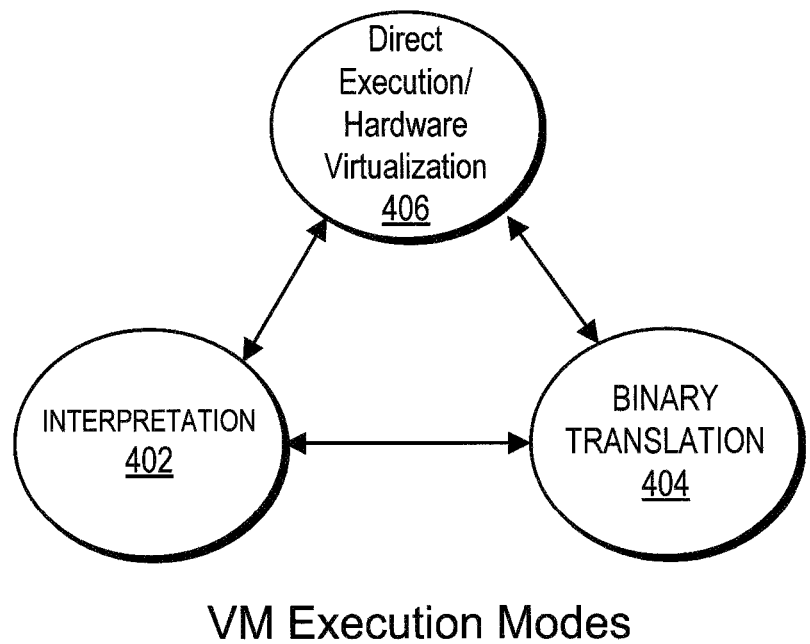
FIG. 4 is a state transition diagram that illustrates operating modes of a virtual machine monitor in accordance with one or more embodiments of the present invention.

FIG. 4 is a state transition diagram that illustrates operating modes of a virtual machine monitor (for example, VMM 300-1 shown in FIG. 2) in accordance with one or more embodiments of the present invention. As shown in FIG. 4, VMM 300-1 can operate in one of three execution modes: interpretation mode 402, binary translation mode 404, and direct execution/hardware virtualization mode 406 (DE/HV 406). In interpretation mode 402, VMM 300-1 decodes guest instructions one at a time, and emulates an instruction via a sequence of instructions that are executable on host system hardware 100-1. In binary translation mode 404, blocks of guest instructions are translated and stored in a translation cache (not shown). Because translated instructions can be accessed from the translation cache in subsequent iterations, binary translation mode 404 typically has less software overhead and offers higher performance than interpretation mode 402. In DE/HV mode 406, guest instructions are executed directly on host system hardware 100-1. DE/HV mode 406 typically offers the highest performance. In some embodiments, direct execution and hardware virtualization can be considered two distinct execution modes. For example, Direct Execution (DE) generally refers to executing guest instruction directly on processors that lack hardware virtualization features, whereas Hardware Virtualization (HV) denotes executing guest instruction directly on processors equipped with hardware virtualization features such as an Intel VT processor or an AMD SVM processor. However, because similar methods are applied using direct execution and hardware virtualization, DE and HV modes are often grouped together in the discussion that follows.

VMM 300-1 can dynamically switch between execution modes during execution of guest instructions. Furthermore, VMM 300-1 maintains tracking of execution points as it switches between execution modes. Methods for dynamically determining and setting execution modes are described in further detail in U.S. patent application Ser. No. 12/057,191 entitled "System and Methods for Dynamic Selection and Application of Multiple Virtualization Techniques," filed on Mar. 27, 2008, the content of which is incorporated by reference herein in its entirety. Methods for tracking an execution point across multiple execution modes are described in further detail in U.S. application Ser. No. 12/057,282 entitled "Using Branch Instruction Counts to Facilitate Replay of Virtual Machine Instruction Execution," filed on Mar. 27, 2008, the content of which is incorporated by reference herein in its entirety.

Figure 5:
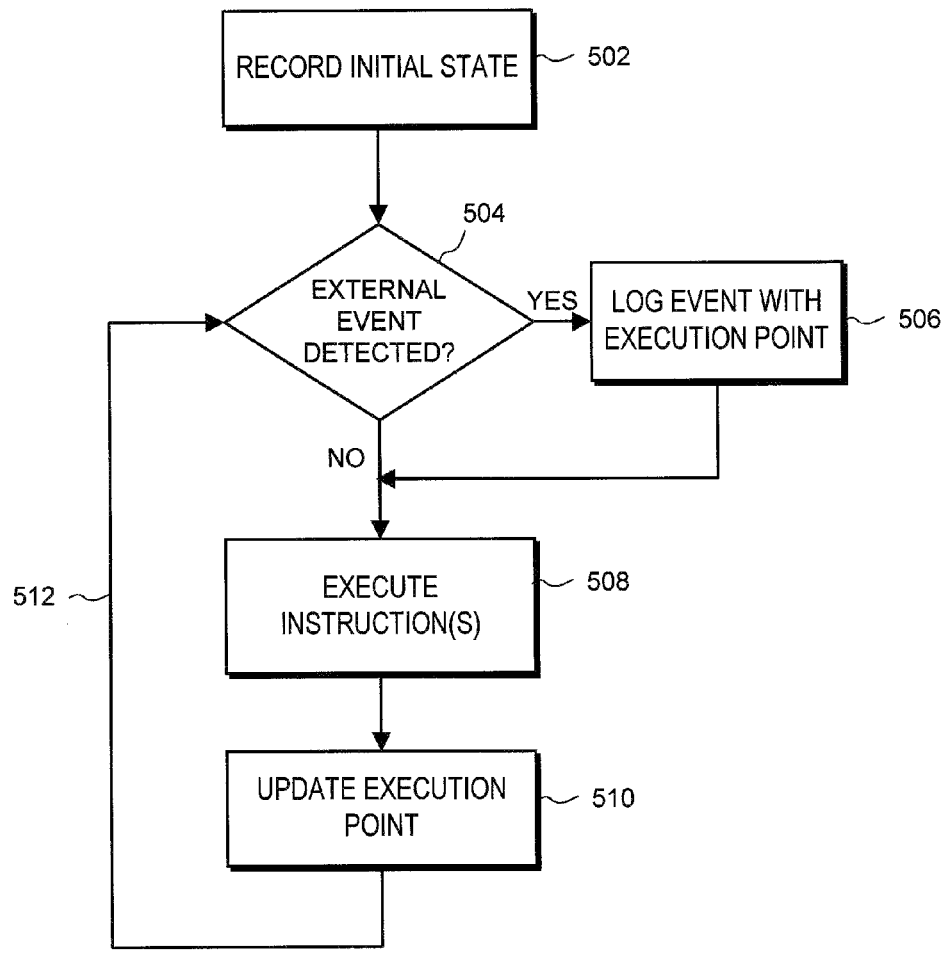
FIG. 5 is a flowchart illustrating a method for logging events to capture an execution trace of a workload on a virtual machine in accordance with one or more embodiments of the present invention.

FIG. 5 is a flowchart that illustrates a method for logging events to capture an execution trace of a workload on a virtual machine (for example, VM 200-1) in accordance with one or more embodiments of the present invention. As shown in FIG. 5, at step 502, VMM 300-1 records an initial state of VM 200-1 to event log 280 (as will be described below, the initial state is used to initialize replay VM 200-2 for replay of the execution sequence). Recording the initial state may entail, for example, recording a reference to a stored checkpoint or other known state (e.g., the power up state) or it may entail capturing and storing a new checkpoint. At decision step 504, throughout an execution sequence, VMM 300-1 monitors for the occurrence of a non-deterministic event. If a non-deterministic event occurs, control is transferred to step 506. If a non-deterministic event does not occur, control is transferred to step 508. At step 508, a virtual processor (for example, VCPU 210-1 shown in FIG. 2) executes an instruction or set of instructions, and control is transferred to step 510. At step 510, VMM 300-1 updates an execution point to track progress of the execution sequence, and control is transferred back to step 504. At step 506, VMM 300-1 logs the non-deterministic event and "time stamps" it with (i.e., stores it with) the current execution point (e.g., the tuple {eip, brCnt, ecx}). The method operates until the capture process is terminated (e.g., by a user).

Figure 6:
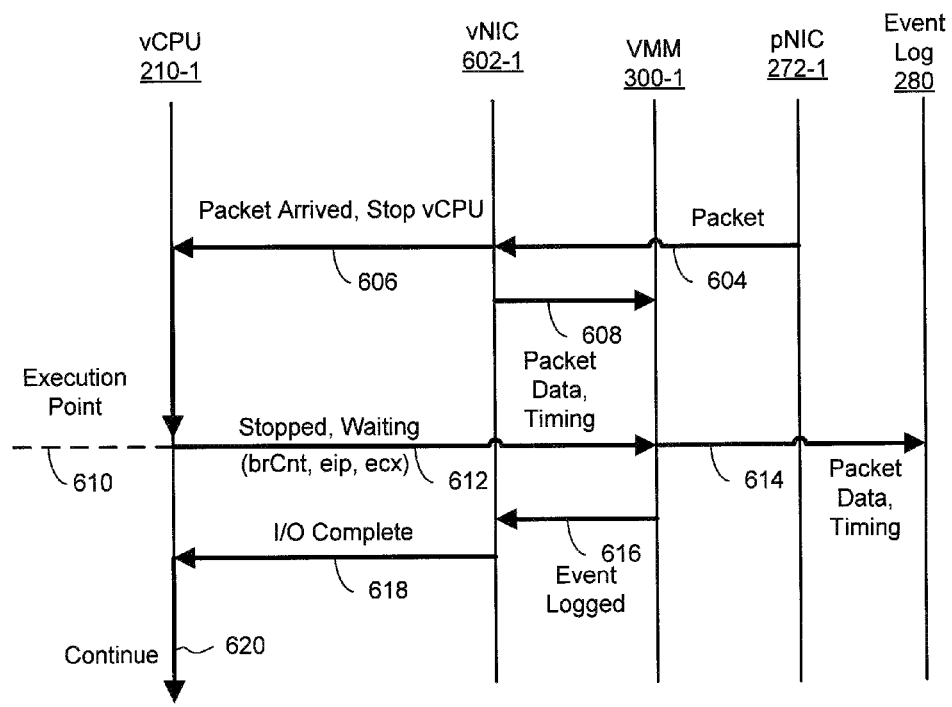
FIG. 6 is an interaction diagram illustrating a method for capturing a network packet event in accordance with one or more embodiments of the present invention.

FIG. 6 is an interaction diagram illustrating a method for capturing a network packet (non-deterministic) event during execution of a workload on VM 200-1 in accordance with one or more embodiments of the present invention. As will be apparent to one of ordinary skill in the art, further embodiments of the inventive method can be readily provided for capturing other types of non-deterministic events involving interactions between additional or different components. In this embodiment, interaction is illustrated between physical NIC 272-1 (pNIC 272-1), virtual NIC 602-1 (vNIC 602-1), virtual CPU 210-1 (VCPU 210-1), VMM 300-1, and event log 280.

As shown in FIG. 6, pNIC 272-1 receives a packet (e.g., from network 274), and issues packet 604 to vNIC 602-1 of VM 200-1. The receipt of the packet is a non-deterministic event because the transmission of packet 604 is determined externally to VM 200-1. In response, vNIC 602-1 transmits signal 606 to VCPU 210-1 to indicate that packet 604 has been received. Signal 606 may, for example, cause a flag to be set that triggers an interrupt at VCPU 210-1. In addition, signal 606 indicates that VCPU 210-1 should temporarily stop execution when it finishes executing the current instruction and reaches execution point 610. Meanwhile, vNIC 602-1 provides received packet data and timing information 608 (e.g., the execution point of the packet event) to VMM 300-1. When execution point 610 is reached, VCPU 210-1 transmits signal 612 to VMKernel 600-1 indicating that VCPU 210-1 is stopped, and VCPU 210-1 provides the current execution point of VCPU 210-1 to VMM 300-1. In response, VMM 300-1 records packet data and timing information (execution point) 614 to event log 280. VMM 300-1 then sends signal 616 to vNIC 602-1 to alert it that the event has been logged. In response, vNIC 602-1 issues I/O complete signal 618 to VCPU 210-1. In response, vCPU 210-1 continues the execution sequence at 620.

Figure 7:
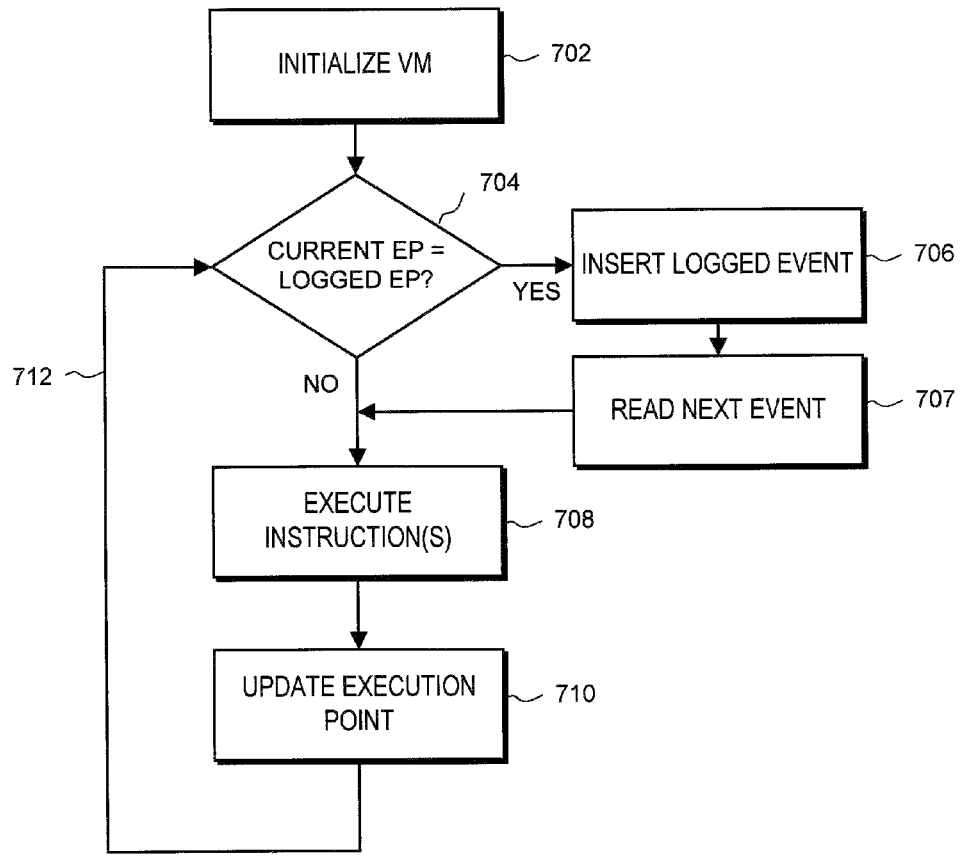
FIG. 7 is a flowchart illustrating a method for replaying an execution sequence using a captured execution trace in accordance with one or more embodiments of the present invention.

FIG. 7 is a flowchart illustrating a method for replaying an execution sequence using a captured execution trace in accordance with one or more embodiments of the present invention. At step 702, replay VM 200-2 is initialized to a known initial state indicated by event log 280 by configuring VM 200-2 to the initial state of the captured execution trace. At decision step 704, during replay, VMM 300-2 monitors the current execution point. If the current execution point matches the execution point of a logged event, control is transferred to step 706, otherwise, control is transferred to step 708. At step 706, VMM 300-2 inserts the logged event into the execution stream, at step 707, the next event is read from event log 280, and control is transferred to step 708. At step 708, VMM 300-2 executes the next instruction or set of instructions. At step 710, the execution point is updated, and control is transferred to decision 704. The method operates until the end of event log 280 is reached, or until the replay process is otherwise terminated (e.g., by a user).

Figure 8:
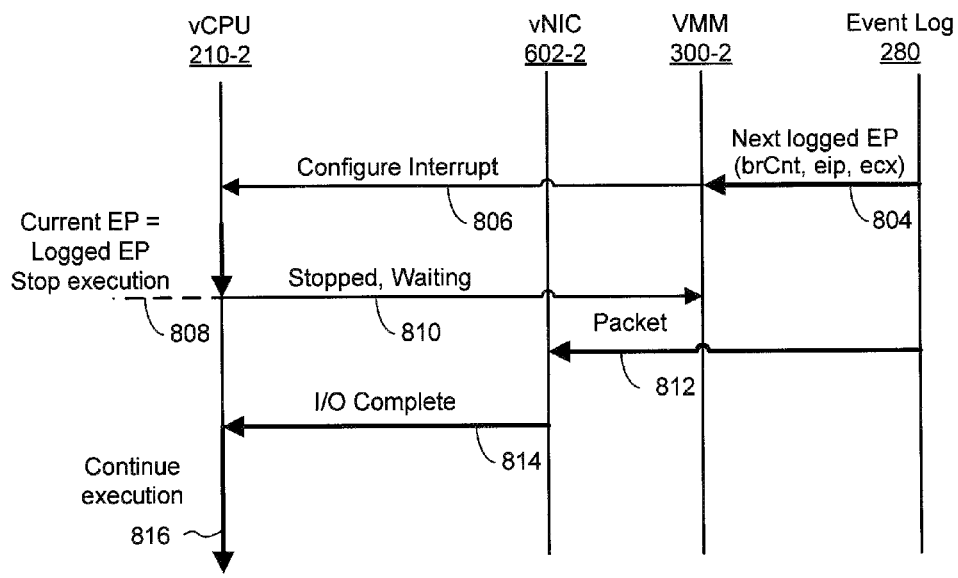
FIG. 8 is an interaction diagram illustrating an example of replaying a captured network packet event in accordance with one or more embodiments of the present invention.

FIG. 8 is an interaction diagram illustrating a method for replaying a captured network packet (non-deterministic) event during execution of a workload on VM 200-2 in accordance with one or more embodiments of the present invention. As indicated in FIG. 8, VMM 300-2 reads execution point 804 of the next logged event from event log 280. In response, VMM 300-2 configures interrupt 806 associated with a physical CPU (not shown) to trigger an interrupt at VCPU 210-2 when an execution point of VCPU 210-2 reaches execution point 804 (i.e., the logged execution point).

As shown in FIG. 8, VCPU 210-2 executes until it reaches 808, i.e., where the current execution point equals logged execution point 804, and then VCPU 210-2 stops executing the execution sequence. Next, VCPU 210-2 sends signal 810 to VMM 300-2 indicating that it is stopped, and is waiting for the logged event to be inserted into the execution sequence. In the case of a network packet event, virtual NIC 602-2 (vNIC 602-2) reads packet 812 from event log 280, and issues I/O complete signal 814 to VCPU 210-2. In response, VCPU 210-2 continues the execution sequence. As one of ordinary skill in the art can readily appreciate, further steps similar to those described above are carried out for subsequent logged events.

Figure 9:
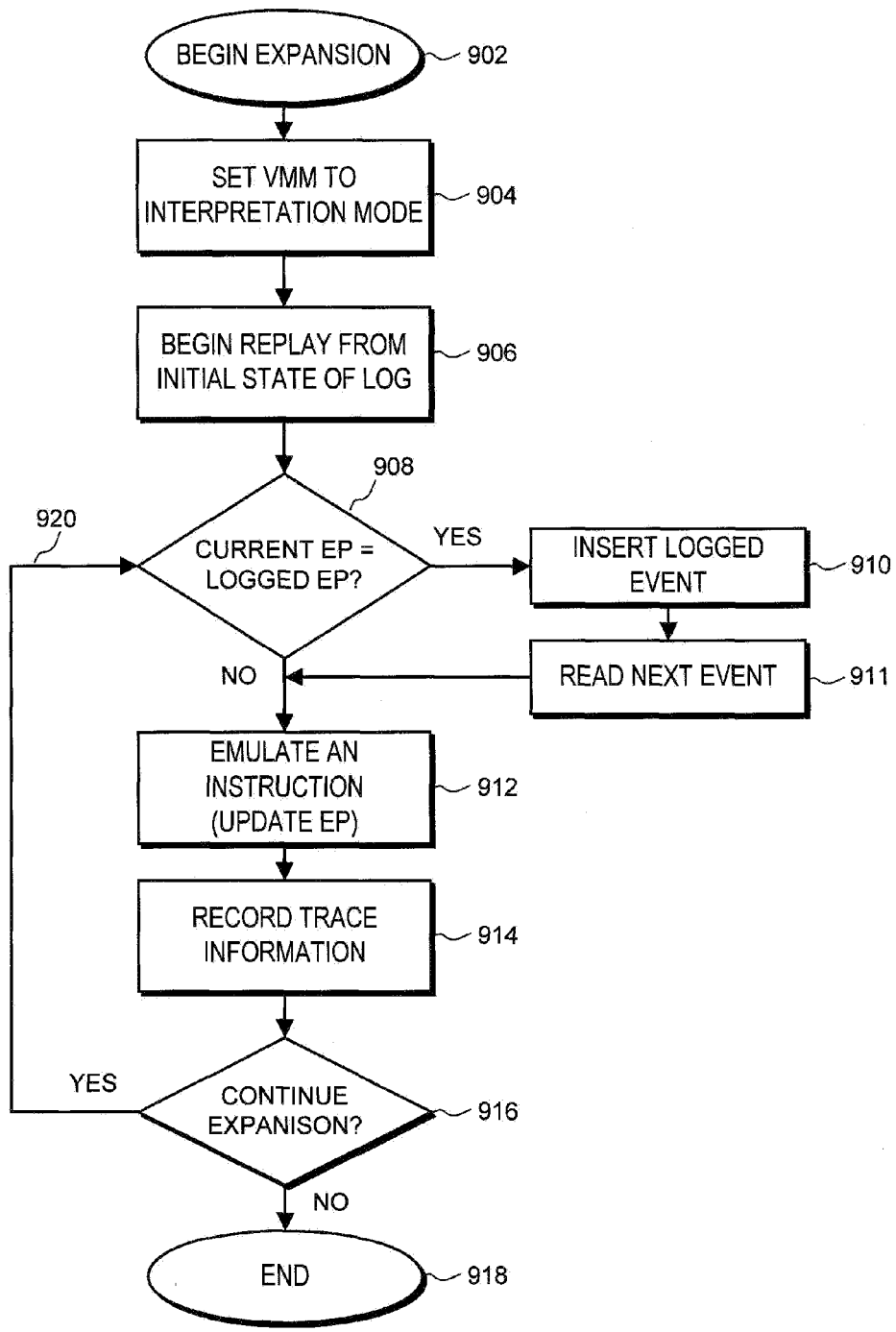
FIG. 9 is a flowchart illustrating a method for trace expansion in accordance with one or more embodiments of the present invention.

FIG. 9 is a flowchart illustrating a method for trace expansion in accordance with one or more embodiments of the present invention. As shown in FIG. 9, at step 902, VMM 300-2 receives a signal to begin trace expansion. In accordance with one or more embodiments of the present invention, the signal may be received, for example and without limitation, based on user input via a user interface. At step 904, VMM 300-2 is set to interpretation mode to decode and emulate instructions one at a time. At step 906, VM 200-2 begins replaying an execution sequence from a known initial state indicated by event log 280. At decision step 908, during replay, VMM 300-2 monitors the current execution point. If the current execution point matches the execution point of a logged event, control is transferred to step 910, otherwise, control is transferred to decision step 912. At step 910, VMM 300-2 inserts the logged event into the execution stream, and at step 911, the next event is read from event log 280, and control is transferred to step 912. At step 912, VMM 300-2, in interpretation mode, emulates the next instruction (at the current execution point), and, after the instruction is emulated, VMM 300-2 obtains the state of VM 200-2. At step 914, VMM 300-2 records trace information. As previously described, event log 280 stores only non-deterministic events. Typically non-deterministic events are relatively rare in VM execution. This means that the VM 200-2 may execute many instructions between two nondeterministic events. In accordance with one or more embodiments of the present invention, an expanded trace may contain detailed information for each instruction. Therefore, between any two nondeterministic events in event log 280, many trace events may be generated and logged during trace expansion. Of course, in accordance with one or more embodiments of the present invention, trace information can be selectively recorded based on expansion parameters 282 input to VMM 300-2. For example, VMM 300-2 may record full instruction trace information, memory reference trace information or device event trace information of VM 200-2. In accordance with one or more such embodiments, a trace file may contain, for example and without limitation, a processor's current privilege level (CPL), an instruction pointer, exceptions, faults, interrupts, state register values, segment values, and control register values. At decision step 916, VMM 300-2 determines if trace expansion should continue for another instruction. If trace expansion continues, control is transferred to step 908. The method ends at step 918 when the end of event log 280 is reached, or the process is otherwise terminated (e.g., by a user).

Figure 10:
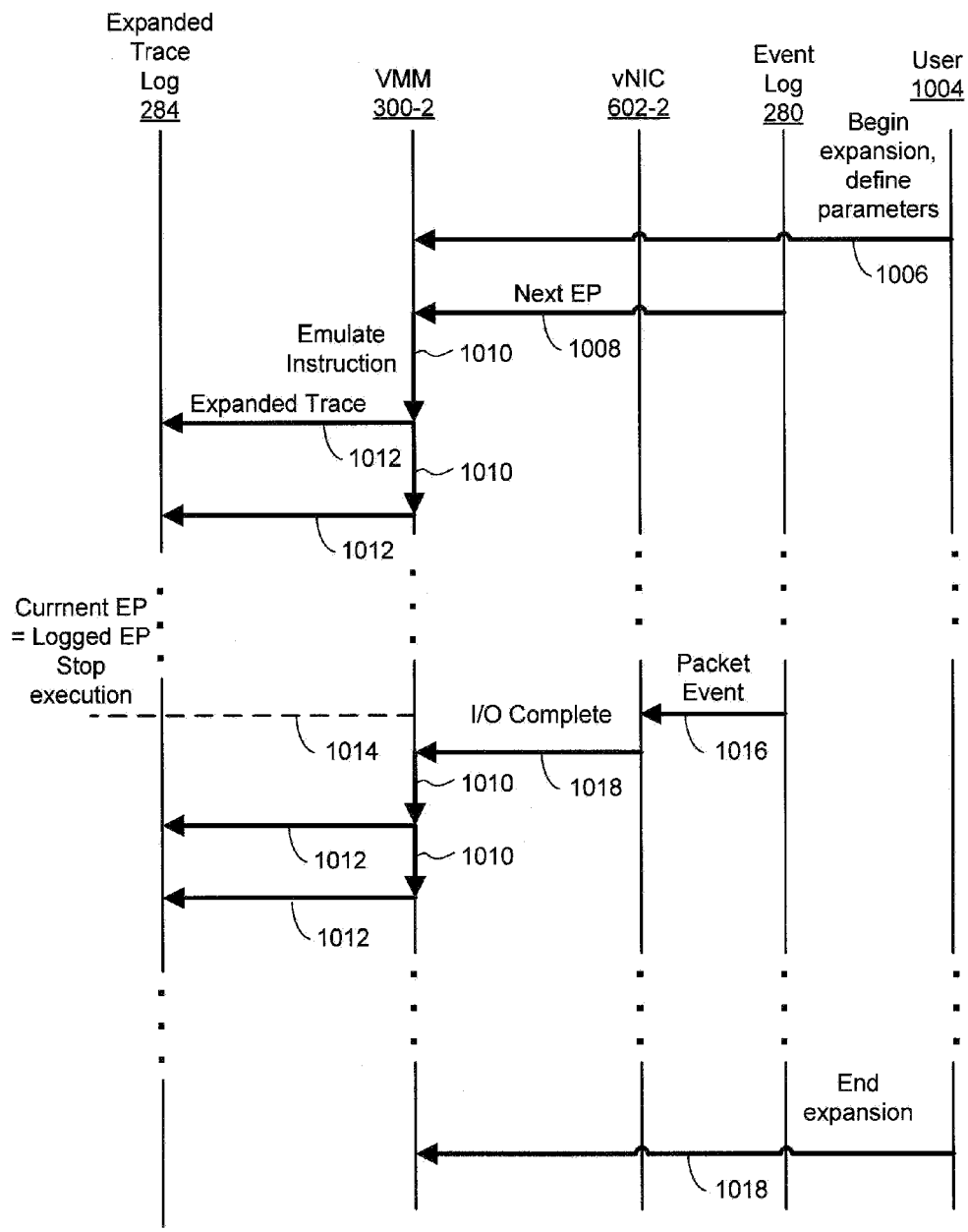
FIG. 10 is an interaction diagram illustrating an example of trace expansion from a log of network packet events in accordance with one or more embodiments of the present invention.

FIG. 10 is an interaction diagram illustrating an example of trace expansion from a log of network packet events in accordance with one or more embodiments of the present invention. As indicated in FIG. 10, a user instructs VMM 300-2 using a conventional user interface (not shown) to begin expansion, and provides expansion parameters 1006 defining what information to include in an expanded trace (for example, expanded trace 284 of FIG. 2). In response, VMM 300-2 is configured to be in interpretation mode, and VMM 300-2 reads the next logged execution point 1008 from event log 280. Then, at indicated by arrow 1010, VMM 300-2 emulates the next instruction in an execution sequence in interpretation mode. After emulating the instruction, VMM 300-2 inspects the register, memory and device states of VM 200-2, and writes expanded trace information 1012 to expanded trace log 284. In accordance with one or more such embodiments, expanded trace log 284 may include full state information, or it may include only changed state information. Then, the process of emulating instructions and recording expanded trace information (represented by arrows 1010 and 1012) repeats for each instruction until logged execution point 1014 is reached. At logged execution point 1014, vNIC 602-2 reads packet event 1016 from event log 280, and issues I/O complete signal 1018. Other types of events can similarly be inserted into the execution sequence based on event log 280. After inserting the logged event, VMM 300-2 continues emulating instructions and recording expanded trace information (again represented by arrows 1010 and 1012). The expansion process continues so that each logged event in event log 280 is inserted into the execution sequence at its recorded execution point until user ends it by sending signal or information represented by arrow 1018 to VMM 300-2 or the end of event log 280 is reached. Alternatively, the expansion process can end after a predetermined period of time, after a predetermined set of trace information is acquired, or after a pre-defined guest event is observed, such as execution of a particular instruction.

One or more embodiments of the present invention may be used to advantage in both a hosted and a non-hosted virtualized computer system, regardless of the degree of virtualization, in which the virtual machine(s) have any number of physical and/or logical virtualized processors. In addition, such one or more embodiments may also be implemented directly in a computer's primary operating system (OS), both where the OS is designed to support virtual machines, and where it is not.

Upon reading this disclosure, those of skill in the art will appreciate still additional alternative embodiments through the disclosed principles. Thus, while particular embodiments and applications of the disclosed embodiments have been illustrated and described, it is to be understood that the embodiments are not limited to the precise construction and components disclosed herein. Various modifications, changes and variations which will be apparent to those skilled in the art may be made in the arrangement, operation and details of the method and apparatus of the embodiments disclosed herein without departing from the scope of the embodiments as defined in the appended claims.

Appendix Relating to Virtualized Computer Systems

As is well known in the field of computer science, a virtual machine (VM) is an abstraction—a "virtualization"—of an actual physical computer system. FIG. 1 shows one possible arrangement of computer system 700 that implements virtualization. As shown in FIG. 1, virtual machine (VM) or "guest" 200 is installed on a "host platform," or simply a "host," which includes system hardware, that is, hardware platform 100 of computer system 700, and one or more layers or co-resident components comprising system-level software, such as an operating system or similar kernel, or a virtual machine monitor or hypervisor (see below), or some combination of these. System hardware 100 typically includes one or more processors 110, memory 130, some form of mass storage 140, and various other devices 170.

Each VM 200 will typically have both virtual system hardware 201 and guest system software 202. The virtual system hardware typically includes at least one virtual CPU (VCPU0 210-0 to VCPUm 210-m), virtual memory 230 (VMEM 230), at least one virtual disk 240 (VDISK 240), and one or more virtual device(s) 270 (VDEVICE(S) 270). Note that a disk—virtual or physical—is also a "device," but is usually considered separately because of the important role of the disk. All of the virtual hardware components of the VM 200 may be implemented in software using known techniques to emulate corresponding physical components. Guest system software 202 includes guest operating system (OS) 220 and drivers 224, as needed for the various virtual devices 270.

Note that a single VM (for example, VM 200) may be configured with more than one virtualized processor, for example, FIG. 1, illustrates multiple virtual processors VCPU0 210-0, VCPU1 210-1, . . . , VCPUm 210-m. Embodiments described herein may be used regardless of the type of multi-threading—physical and/or logical—or the number of processors included in a VM. The design and operation of virtual machines are well known.

Some interface is generally required between guest software within a VM (for example, VM 200) and various hardware components and devices in underlying system hardware platform 100. This interface—which may be referred to generally as "virtualization software"—may include one or more software components and/or layers, possibly including one or more software components known as "virtual machine monitors" (VMMs) (for example, VMM 300, . . . , VMM 300-n shown in FIG. 1), "hypervisors," or virtualization "kernels" (for example, kernel 600 shown in FIG. 1). Because virtualization terminology has evolved over time and has not yet become fully standardized, these terms do not always provide clear distinctions between software layers and the components to which they refer. For example, the term "hypervisor" is often used to describe both a VMM and a kernel (for example, VMM 300 and kernel 600 shown in FIG. 1) together, either as separate but cooperating components or with one or more of VMM 300, . . . , VMM 300-n incorporated wholly or partially into kernel 600 itself; however, the term "hypervisor" is sometimes used instead to mean some variant of a virtual machine monitor alone, which interfaces with some other software layer(s) or component(s) to support the virtualization. Moreover, in some systems, some virtualization code is included in at least one "superior" VM to facilitate the operations of other VMs. Furthermore, specific software support for virtual machines may be included in the host OS itself. Unless otherwise indicated, the embodiments of the present invention described above may be used in virtualized computer systems having any type or configuration of virtualization software.

FIG. 1 shows VMM 300, . . . , VMM 300-n as being separate entities from other components of the virtualization software. Although some software components used to implement one or more embodiments of the present invention are shown and described as being within a "virtualization layer" that is located logically between all virtual machines and the underlying hardware platform and/or system-level host software, this virtualization layer can be considered part of the overall virtualization software (although it would be possible to implement at least part of this layer in specialized hardware). Again, unless otherwise indicated or apparent from the description, it is to be assumed that one or more embodiments of the present invention can be implemented anywhere within the overall structure of the virtualization software, and even in systems that provide specific hardware support for virtualization.

Various virtualized hardware components in VM 200, such as virtual CPU(s) VCPU0 210-0, . . . , VCPUm 210-*m*, virtual memory 230, virtual disk 240, and virtual device(s) 270, are shown as being part of VM 200 for the sake of conceptual simplicity. In actuality, these "components" are usually implemented as software emulations 330 included in VMM 300. In such an arrangement the VMM may (but need not) be set up to expose "generic" devices, which facilitates VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. The term "full virtualization" is sometimes used to denote a system in which no software components are included in the guest other than those that would be found in a non-virtualized computer; thus, guest OS 220 could be an off-the-shelf, commercially available OS with no components included specifically to support use in a virtualized environment. In contrast, the term "para-virtualization" is sometimes used to denote a system wherein the guest is configured to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that guest OS 220 (in particular, its kernel) is specifically designed to support such an interface. According to this view, having, for example, an off-the-shelf version of Microsoft Windows XP as guest OS 220 would not be consistent with the term para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of the present invention are not restricted to use in systems with any particular "degree" of virtualization and are not to be limited to any particular term of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of VMM 300. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002). As illustrated in FIG. 1, in many cases, VMMs 300, . . . , 300-*n* are deployed on top of a software layer—kernel 600—constructed specifically to provide efficient support for VMs 200, . . . , 200-*n*. This configuration is frequently referred to as being "non-hosted." Kernel 600 may also handle other applications running on it that can be separately scheduled, as well as a console operating system that, in some architectures, is used to boot the system and facilitate certain user interactions with the virtualization software. Note that kernel 600 is not the same as a kernel that will be within guest OS 220—as is well known, every operating system has its own kernel. Note also that kernel 600 is part of the "host" platform of the VM/VMM as defined above even though the configuration shown in FIG. 1 is commonly termed "non-hosted"; moreover, the kernel may be both part of the host and part of the virtualization software or "hypervisor." The difference in terminology is one of perspective and definitions that are still evolving in the art of virtualization.

What is claimed is:

1. A computer-implemented method of trace collection for a virtual machine, the computer-implemented method comprising:

executing a sequence of instructions in a first virtual machine and logging a first set of data comprising an event log related to nondeterministic events occurring during the execution of the sequence of instructions in the first virtual machine;

executing the sequence of instructions in a second virtual machine from an initial state while replaying execution of the first virtual machine in the second virtual machine, wherein the second virtual machine is a different virtual machine from the first virtual machine;

accessing the event log from the first set of data relating to nondeterministic events, the event log from the first set of data being used for replaying execution of the first virtual machine in the second virtual machine, the first set of data further comprising an execution point;

making at least a portion of the event log from the first set of data available to the second virtual machine when the sequence reaches the execution point;

collecting trace information in a second set of data from executing the sequence of instructions in the second virtual machine in response to expansion parameters while replaying execution of the first virtual machine in the second virtual machine, said trace information in said second set of data corresponding to characteristics of the replayed execution of the first virtual machine in accordance with the expansion parameters and said collecting of trace information being performed in a manner that does not preclude the accurate replaying of the execution of the first virtual machine in the second virtual machine; and storing the trace information in a trace file;

in which:

collecting trace information comprises receiving the expansion parameters from a user and collecting state information of the second virtual machine based on the expansion parameters;

the state information of the second virtual machine comprises a register state and a memory state of the second virtual machine; and the expansion parameters comprise data indicating the register state and the memory state of the second virtual machine to be collected, wherein the second set of data comprises the trace information, the trace information comprises the state information of the second virtual machine, and the state information comprises the register state and the memory state of the second virtual machine.

2. The computer-implemented method of claim 1, wherein collecting includes collecting the trace information between the execution point and another execution point.

3. The computer-implemented method of claim 1, wherein collecting includes collecting the trace information for a time period.

4. The computer-implemented method of claim 1, wherein the state information comprises register and memory values of the second virtual machine.

5. The computer-implemented method of claim 1, further including receiving an input from a user with collecting further including collecting in response to the input and storing further including storing in response to the input.

6. The computer-implemented method of claim 1, wherein collecting further includes collecting the trace information for user defined instructions present in the sequence of instructions.

7. The computer-implemented method of claim 1, wherein the execution of the sequence of instructions in the second virtual machine is performed in an interpretation mode.

8. A computer program product stored on a non-transitory computer readable storage medium and configured to perform a computer-implemented method of trace collection for a virtual machine, the computer-implemented method comprising:
    executing a sequence of instructions in a first virtual machine and logging a first set of data comprising an event log related to nondeterministic events occurring during the execution of the sequence of instructions in the first virtual machine;
    executing the sequence of instructions in a second virtual machine from an initial state while replaying execution of the first virtual machine in the second virtual machine, wherein the second virtual machine is a different virtual machine from the first virtual machine;
    accessing the event log from the first set of data relating to nondeterministic events, the event log from the first set of data being used for replaying execution of the first virtual machine in the second virtual machine, the first set of data further comprising an execution point;
    making at least a portion of the event log from the first set of data available to the second virtual machine when the sequence reaches the execution point;
    collecting trace information in a second set of data from executing the sequence of instructions in the second virtual machine in response to expansion parameters while replaying execution of the first virtual machine in the second virtual machine, said trace information in said second set of data corresponding to characteristics of the replayed execution of the first virtual machine in accordance with the expansion parameters and said collecting of trace information being performed in a manner that does not preclude the accurate replaying of the execution of the first virtual machine in the second virtual machine; and
    storing the trace information in a trace file;
    in which:
        collecting trace information comprises receiving the expansion parameters from a user and collecting state information of the second virtual machine based on the expansion parameters;
        the state information of the second virtual machine comprises a register state and a memory state of the second virtual machine; and
        the expansion parameters comprise data indicating the register state and the memory state of the second virtual machine to be collected,
    wherein the second set of data comprises the trace information, the trace information comprises the state information of the second virtual machine, and the state information comprises the register state and the memory state of the second virtual machine.

9. The computer program product of claim 8, wherein collecting further includes collecting the trace information between the execution point and another execution point.

10. The computer program product of claim 8, wherein collecting further includes collecting the trace information for a time period.

11. The computer program product of claim 8, wherein the state information of the virtual machine comprises register and memory values of the second virtual machine.

12. The computer program product of claim 8, further including receiving a user input with collecting further including collecting in response to the input and storing further including storing in response to the input.

13. The computer program product of claim 8, wherein collecting includes collecting the trace information for user defined instructions present in the sequence of instructions.

14. The computer program product of claim 8, wherein the execution of the sequence of instructions in the second virtual machine is performed in an interpretation mode.

15. A virtualized computer system installed and executing on physical system hardware, said virtualized computer system including a storage device storing computer instructions configured to perform a computer-implemented method for collecting an execution trace, and one or more processing units for executing the computer instructions, the computer instructions being configured to:
    execute a sequence of instructions in a first virtual machine and log a first set of data comprising an event log related to nondeterministic events occurring during the execution of the sequence of instructions in the first virtual machine;
    execute the sequence of instructions in a second virtual machine from an initial state while replaying execution of the first virtual machine in the second virtual machine, wherein the second virtual machine is a different virtual machine from the first virtual machine;
    access the event log from the first set of data relating to nondeterministic events, the event log from the first set of data being used for replaying execution of the first virtual machine in the second virtual machine, the first set of data further comprising an execution point;
    make at least a portion of the event log from the first set of data available to the second virtual machine when the sequence reaches the execution point;
    collect trace information in a second set of data from executing the sequence of instructions in the second virtual machine in response to expansion parameters while replaying execution of the first virtual machine in the second virtual machine, said trace information in said second set of data corresponding to characteristics of the replayed execution of the first virtual machine in accordance with the expansion parameters and said collecting of trace information being performed in a manner that does not preclude the accurate replaying of the execution of the first virtual machine in the second virtual machine; and
    store the trace information in a trace file;
    in which:
        collecting trace information comprises receiving the expansion parameters from a user and collecting state information of the second virtual machine based on the expansion parameters;

the state information of the second virtual machine comprises a register state and a memory state of the second virtual machine; and the expansion parameters comprise data indicating the register state and the memory state of the second virtual machine to be collected, wherein the second set of data comprises the trace information, the trace information comprises the state information of the second virtual machine, and the state information comprises the register state and the memory state of the second virtual machine.

16. The virtualized computer system of claim 15, wherein the computer instructions to collect are further configured to collect the trace information between the execution point and another execution point.

17. The virtualized computer system of claim 15, wherein the computer instructions to collect are further configured to:
collect the trace information for a time period.

18. The virtualized computer system of claim 15, wherein the state information of the second virtual machine comprises register and memory values of the replay virtual machine.

19. The virtualized computer system of claim 15 further includes computer instructions to receive an input from a user and the computer instructions to collect further include instructions to collect in response to the input and the computer instruction to store further include instructions to store in response to the input.

20. The virtualized computer system of claim 15, wherein the computer instructions to collect are further configured to:
collect the trace information for user defined instructions present in the sequence of instructions.

21. The virtualized computer system of claim 15, wherein the execution of the sequence of instructions in the second virtual machine is performed in an interpretation mode.

* * * * *